United States Patent [19]

Kawabata

[11] Patent Number: 5,793,819
[45] Date of Patent: Aug. 11, 1998

[54] RADIO COMMUNICATION TERMINAL STATION

[75] Inventor: Hisashi Kawabata, Tokyo, Japan

[73] Assignee: NEC Corporation, Tokyo, Japan

[21] Appl. No.: 621,686

[22] Filed: Mar. 26, 1996

[30] Foreign Application Priority Data

Mar. 31, 1995 [JP] Japan ..................... 7-075101

[51] Int. Cl.⁶ ............................................ H04L 27/06
[52] U.S. Cl. ...................... 375/344; 375/326; 375/327; 455/260; 455/263
[58] Field of Search ...................... 375/219, 222, 375/223, 293, 294, 324, 326, 327, 344, 362, 371, 373, 375, 376; 455/257, 258, 260, 263; 329/302, 306, 307, 309

[56] References Cited

U.S. PATENT DOCUMENTS

| | | | |
|---|---|---|---|
| 3,758,720 | 9/1973 | Dinn | 375/376 |
| 4,932,070 | 6/1990 | Waters et al. | |
| 5,090,025 | 2/1992 | Marshall et al. | 375/376 |
| 5,111,162 | 5/1992 | Hietala et al. | 375/344 |
| 5,335,348 | 8/1994 | Kono | 455/257 |
| 5,483,686 | 1/1996 | Saka et al. | 455/182.2 |
| 5,487,186 | 1/1996 | Scarpa | 455/258 |

FOREIGN PATENT DOCUMENTS 2248137 10/1990 Japan.

*Primary Examiner*—Chi H. Pham
*Assistant Examiner*—Emmanuel Bayard
*Attorney, Agent, or Firm*—Whitham, Curtis & Whitham

[57] ABSTRACT

A radio communication terminal station, includes a demodulator for receiving a digital modulation signal and generating a reproduction carrier wave and a reproduction clock signal, an oscillator having a frequency control function, an automatic frequency controller for controlling the frequency of an oscillation signal of the oscillator with reference to the reproduction carrier wave, a frequency divider for dividing the frequency of an output signal of the oscillator and outputting a reception clock signal and a transmission clock signal, a phase comparator for comparing the phase of the reception clock signal that is the output signal of the frequency divider with the phase of the reproduction clock signal and outputting a phase difference signal, and a frequency dividing controller for controlling the frequency dividing ratio of the frequency divider corresponding to the phase difference signal.

20 Claims, 7 Drawing Sheets

RADIO COMMUNICATION TERMINAL STATION

BACKGROUND OF THE INVENTION

1. Field of the Invention

The present invention relates to a radio communication terminal station, in particular, to a system for controlling transmission/reception clocks and a synthesizer of a digital communication terminal station.

2. Description of the Related Art

As a demodulation synchronous controlling method for use with a radio communication system that communicates between a base station (parent station) and a terminal station (child station), a radio communication terminal station using a clock on the base station side is known. FIG. 7 is a block diagram showing a structure of such a radio communication terminal station. Next, the structure of the radio communication terminal station will be described.

In FIG. 7, a reception terminal 21, a mixer 22, a demodulator 23, and a reception data output terminal 24 compose a receiving portion. A transmission data terminal 34, a modulator 33, a mixer 32, and an output terminal 31 compose a transmitting portion. TCXOs (Temperature Compensated crystal Oscillators) 27 and 28 are oscillators with voltage control function. An AFC 26 is an automatic frequency controlling circuit. The AFC 26 controls the frequency of the TCXO 27. The TCXO 27 controls a synthesizer circuit 25. The synthesizer circuit 25 has a local transmission/reception oscillator and a phase comparator. The synthesizer circuit 25 compares the phase of a frequency divided signal that is an output signal of the local oscillator with the phase of a frequency divided signal that is an output signal of the TCXO 27 with a voltage control function and controls the local oscillator corresponding to the phase difference.

The radio communication terminal station receives a signal from a base station, reproduces a clock signal with the demodulator 23, and automatically controls the frequency of the TCXO 27 with reference to the reproduced clock signal. Since the output signal of the oscillator 27 is used as a reference clock signal of the transmission/ reception synthesizer, the frequency of the output signal of the local oscillator in the synthesizer is accurately maintained and thereby the synthesizer is highly stabilized. This structure is disclosed in for example Japanese Patent Laid-Open Publication No. 2-248137.

In the above-described conventional terminal station apparatus, when the frequency of the transmission clock signal of the base station is highly stabilized, the frequency of the local transmission/reception oscillator is controlled so as to highly stabilize the operation of the synthesizer without need to use a highly stable crystal oscillator with a thermostatic bath on the terminal station side.

However, in the terminal station apparatus, it has not been considered to stably maintain the frequency of the transmission clock signal. Thus, as the TCXO 28, a crystal oscillator with high stability is required. Consequently, the conventional terminal station apparatus has problems on size reduction, power reduction, and cost reduction.

SUMMARY OF THE INVENTION

An object of the present invention is to provide a radio communication terminal station that allows the frequencies of a reception clock signal and a transmission clock signal to be highly stabilized without need to use a crystal oscillator with high reliability.

Another object of the present invention is to provide a radio communication terminal station apparatus that uses a carrier frequency and a clock frequency of a highly stable transmission wave of a base station so as to remarkably suppress jitter of a reception clock signal and a transmission signal.

A further object of the present invention is to provide a radio communication terminal station that allows a transmission clock signal and the frequency of a synthesizer to be stable as with a carrier frequency of a transmission wave of a base station.

A first aspect of the present invention is a radio communication terminal station, comprising demodulating means for receiving a digital modulation signal and generating a reproduction carrier wave and a reproduction clock signal, an oscillator having a frequency control function, an automatic frequency controlling means for controlling the frequency of an oscillation signal of the oscillator having the frequency control function with reference to the reproduction carrier wave, a frequency divider for dividing the frequency of an output signal of the oscillator having the frequency control function and outputting a reception clock signal and a transmission clock signal, a phase comparator for comparing the phase of the reception clock signal that is the output signal of the frequency divider with the phase of the reproduction clock signal and outputting a phase difference signal, and a frequency dividing controller for controlling the frequency dividing ratio of the frequency divider corresponding to the phase difference signal.

A second aspect of the present invention is a radio communication terminal station, comprising a mixer means for converting a reception signal modulated with a digital signal into an intermediate frequency signal or a base band signal, a demodulating means for receiving an output signal of the mixer means and generating a reproduction carrier wave and a reproduction clock signal, an oscillator having a frequency control function, an automatic frequency controlling means for controlling the frequency of an oscillation signal of the oscillator having the frequency control function corresponding to the reproduction carrier wave, a synthesizer for receiving an output signal of the oscillator and outputting a reference signal, a frequency divider for dividing the frequency of the output signal of the oscillator and outputting a reception clock signal and a transmission clock signal, a phase comparator for comparing the phase of the reception clock signal that is the output signal of the frequency divider with the phase of the reproduction clock signal and outputting a phase difference signal, and a frequency dividing controller for controlling the frequency dividing ratio of the frequency divider corresponding to the phase difference signal, wherein the mixer means is adapted for converting the reception signal into the intermediate frequency signal or the base band signal corresponding to the output signal of the synthesizer.

The receiving terminal according to the present invention has one of the following means.

1. The frequency divider comprises a first frequency divider portion for dividing the frequency of the output signal of the oscillator and outputting a signal of a integral number time frequency of the reception clock signal, a second frequency divider portion for compensating the phase of the reception clock signal, and a third frequency divider portion for dividing the frequencies of output signals of the first frequency divider portion and the second frequency divider portion and outputting at least the reception clock signal. The frequency dividing controller is adapted for switching and controlling the first frequency divider portion and the second frequency divider portion corresponding to the phase difference signal.

2. The first frequency divider portion is composed of a plurality of frequency dividers with different frequency dividing ratios. The frequency dividing controller is adapted for switching among the plurality of frequency divider portions. The second frequency divider portion is composed of a plurality of frequency divider members with different frequency dividing ratios. The frequency dividing controller is adapted for selecting one of the plurality of frequency divider members corresponding to the phase difference signal and adjusting the phase.

3. The frequency divider further comprises a fourth frequency divider for dividing the frequency of the output signal of the first frequency divider portion or the frequency of the output signal of the oscillator and outputting the transmission clock signal.

4. The radio communication terminal station further comprising a modulator for receiving transmission data and modulating the transmission data with the transmission clock signal and a second mixer means for converting the frequency of the output signal of the modulator with the output signal of the synthesizer and outputting a resultant signal.

In the radio communication system having a base station and a terminal station, when the stability of the frequency of a transmission carrier wave of the base station is satisfactorily high, the frequency of the oscillator with frequency control function controlled by an AFC that uses a reproduction carrier signal of the communication terminal station as a reference signal can be highly stabilized.

Since the output signal of the oscillator with frequency control function is used as a reference clock of the transmission/reception synthesizer, the accuracy of the output frequency of the synthesizer can be highly maintained.

The reception clock signal and the transmission clock signal of the communication terminal station are generated by the frequency divider that divides the output signal of the oscillator with frequency control function. By comparing the phase of the output signal of the frequency divider with the phase of the reproduction clock signal and controlling the frequency dividing ratio, the frequency and the phase of the reception clock signal can be highly accurately synchronized with those of the reproduction clock signal.

In a system that requires that the transmission clock signal should synchronize with the reception clock single, the transmission clock signal is generated as with the reception clock signal. Thus, the same stability as the clock signal of the base station can be accomplished.

In a system that does not require that the transmission clock signal should synchronize with the reception clock signal, when the frequency of the oscillator is divided by the frequency divider without reference of the output signal of the phase comparator, the same stability as the carrier wave of the base station can be accomplished on the frequency divider.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Figure 1:
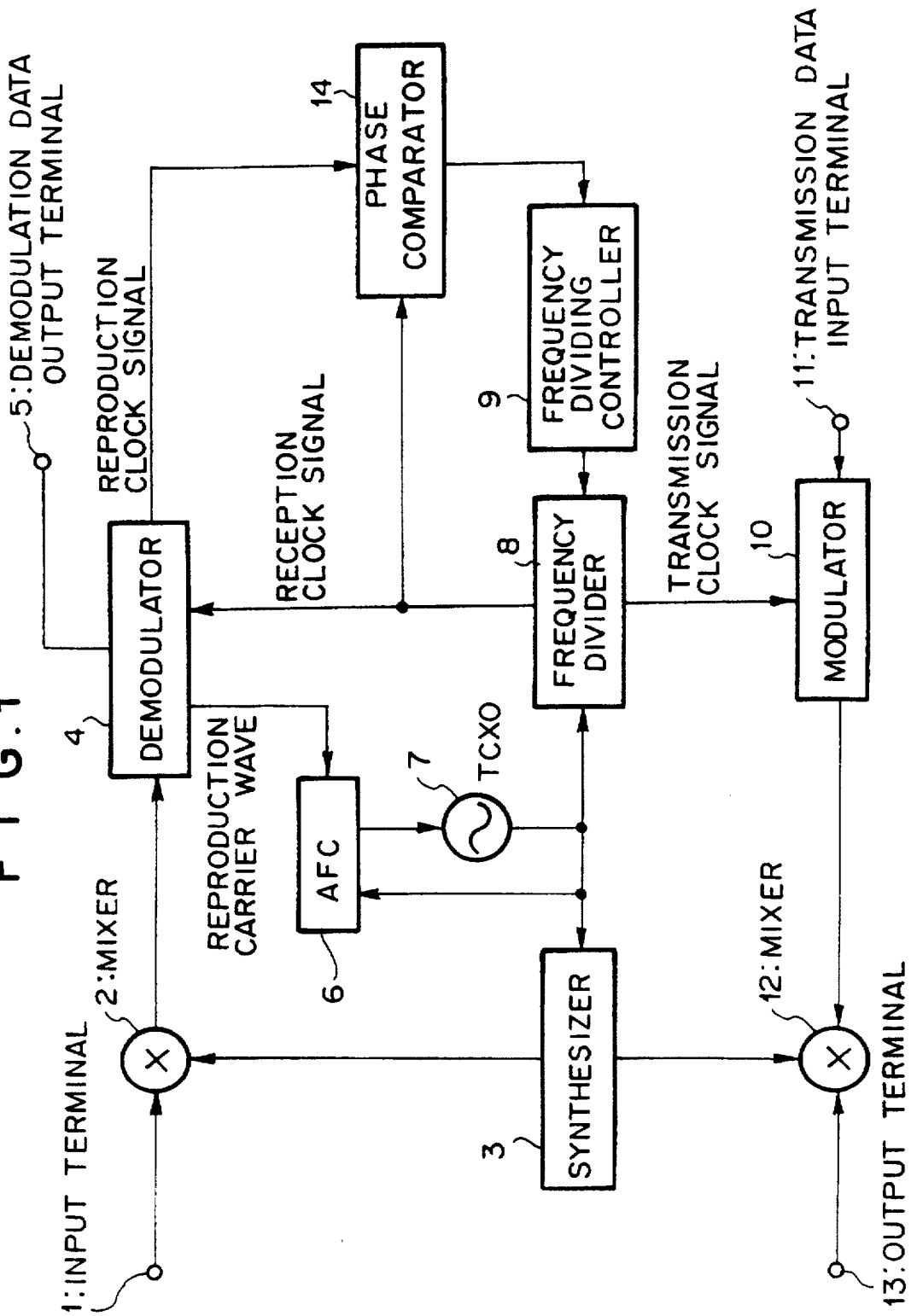
FIG. 1 is a block diagram showing a structure of a radio communication terminal station according to an embodiment of the present invention.

The present invention will be described with reference to the accompanying drawings. FIG. 1 is a block diagram showing a radio communication terminal station according to the present invention. A receiving portion of the radio communication terminal station comprises an input terminal 1, a synthesizer 3, at least one stage mixer 2, a demodulator 4, a temperature compensated crystal oscillator (TCXO) 7, an automatic frequency controller (AFC) 6, a frequency divider 8, a phase comparator 14, and a frequency dividing controller 9. A transmission signal of a base station is received from the input terminal 1. The synthesizer 3 outputs a local oscillation signal. The mixer 2 converts a reception signal to an intermediate frequency signal or a data base signal corresponding to the local oscillation signal. The demodulator 4 has an output terminal 5 from which demodulation data is output. The TCXO 7 has a voltage control function. The AFC(Automatic Frequency Control) 6 controls the TCXO 7 with a reproduction carrier wave received from the demodulator 4. The frequency divider 8 divides the frequency of the output signal of the TCXO 7 and outputs a reception clock signal and a transmission clock signal. The phase comparator 14 compares the phase of the reproduction clock signal received from the demodulator 4 with the phase of the reception clock signal. The frequency dividing controller 9 receives phase difference information of the phase comparator 14 and controls the frequency divider 8 corresponding to the phase difference information. The mixer 2 outputs an intermediate frequency signal. Alternatively, a plurality of stage mixers are disposed in the mixer 2. The last stage mixer performs a semi-synchronous detection and outputs a base band signal.

The synthesizer circuit 3 comprises a voltage control type local oscillator, a phase comparator, and a frequency divider for use with a transmission/reception mixer 2 and 12. The synthesizer circuit 3 has a PLL circuit structure that controls the local oscillator corresponding to a phase difference between the phase of the output signal of the local oscillator or the phase of a frequency divided signal thereof and the phase of a frequency divided signal of the output signal of the TCXO 7 with the voltage control function.

A transmitting portion of the radio communication terminal station comprises an input terminal 11, a modulator 10, a mixer 12, and an output terminal 13. Transmission data is received from the input terminal 11. The modulator 10 modulates the transmission data with the transmission clock signal of the frequency divider 8. The mixer 12 converts the frequency of the modulation output signal with the transmission local oscillation signal of the synthesizer 3. The output terminal 13 outputs the modulation wave signal to, for example, antenna terminal Next, the operation of the radio communication terminal station shown in FIG. 1 will be described.

In the radio terminal station shown in FIG. 1, a transmission signal of a base station is received from the input terminal 1. The mixer 2 converts the input signal into an intermediate frequency signal or a base band signal corresponding to the output signal of the synthesizer 3. A reception antenna or a coaxial cable may be disposed before the input terminal 1. Alternatively, a high frequency amplifier may be disposed before the input terminal 1.

The demodulator 4 includes for example a phase synchronous circuit and a synchronous detecting circuit, which is a demodulating detector, and receives the intermediate frequency signal or the base band signal. The synchronous detecting circuit detects the base band signal with the intermediate frequency signal through the synchronous detecting circuit and reproduces and decodes the carrier signal and the clock signal with the base band signal. The demodulator 4 performs a retiming of demodulation data and outputs the demodulation data from the output terminal 5 corresponding to the reception clock signal. In addition, the demodulator 4 outputs the reproduction carrier wave and the reproduction clock.

The AFC 6 receives the reproduction carrier wave from the demodulator 4, detects a frequency difference of the reproduction carrier wave and a output signal of the TCXO 7, and controls the TCXO 7 corresponding to the frequency difference. The synthesizer 3 receives as a reference clock signal the output signal of the TCXO 7 and maintains the stability of the oscillation frequency of the inner local oscillator with the PLL(Phase Locked Loop circuit) structure.

The frequency divider 8 divides the frequency of the output signal of the TCXO 7 by a frequency dividing ratio designated by the frequency dividing controller 9 (that will be described later) and outputs the reception clock signal and the transmission clock signal.

The frequency divider 8 divides the frequency of the oscillation output signal of the TCXO 7 corresponding to the operation of the frequency dividing controller 9 so as to obtain desired transmission/reception clock signals. The frequency divider 8 is generally a frequency divider with a non-integer frequency dividing ratio.

The modulator 10 receives the transmission data from the input terminal 11 and the transmission clock signal from the frequency divider 8 and modulates the transmission data with the transmission clock signal. The mixer 12 multiplies the output signal of the modulator 10 by the output signal of the synthesizer 3, converts to a transmission frequency signal, and outputs a transmission signal with a transmission frequency to the output terminal 13.

The phase comparator 14 compares the phase of the reproduction clock signal received from the demodulator 4 with the phase of the reception clock signal used for a sampling clock signal of the demodulator 4 or the like, and output from the frequency divider 8, detects a phase difference, and outputs a phase difference information signal. The phase difference information signal is a difference signal representing that the phase difference between the phase of the reproduction clock signal and the phase of the reception clock signal is zero in a predetermined phase relation corresponding to phase comparison characteristics of the phase comparator.

The frequency dividing controller 9 controls the frequency dividing ratio of the frequency divider 8 so as to divide the frequency of the output signal of the TCXO 7 and output the reception clock signal and the transmission crock signal with desired frequencies. The frequency dividing controller 9 properly controls the phase relation between the phase of the output clock signal and the phase of the reproduction clock signal so that the frequency divider 8 varies the frequency dividing ratio corresponding to the phase difference information signal received from the phase comparator 14, and compensates the phase of the reception clock signal of the frequency divider 8.

Since the portion that processes the base band signal performs a digital signal process and an over-sampling process that samples each symbol of a reception data several times, the frequency of the reception clock signal is used by the frequency of which the frequency of a clock signal in the signal stage of the base band signal is multiplied by the number of times of the over-sampling operation. Thus, the frequency of the intermediate divided frequency output signal is selected as a frequency of a common multiple of the number of times of over-sampling of the frequency of the transmission clock signal and the frequency of the reception clock signal.

When the frequency of the output signal of the TCXO 7 is an integer multiple of the frequencies of the reception clock signal and the transmission clock signal, the frequency of the reception signal of the frequency divider 8 is divided at a fixed integer frequency dividing ratio on the base of an output signal of the frequency dividing controller 9. However, normally, since the frequency of the output signal of the TCXO 7 is not an integer multiple of the frequencies of the reception clock signal and the transmission clock signal, a plurality of different integer frequency dividing ratios are periodically switched so that the average value of the frequencies of the output signal of the frequency divider 8 accords with the frequencies of the reception clock signal and the transmission clock signal.

In the latter case, the frequency dividing ratio is switched between n and n+1 at a switching ratio of s to t. By dividing the frequency of the output signal of the TCXO 7 by a non-integer, as an average value, Fdiv is obtained. In this case, n, s, and t have the following relation.

$$Fref/Fdiv = \{s \times n + t \times (n+1)\}/(s+t)$$

where Fref is the frequency of the output signal of the TCXO 7; Fdiv is the frequency of the output signal of the frequency divider 8; and n and n+1 are frequency dividing ratios.

When the phase of the frequency of the divided frequency output signal of the frequency divider 8 has a delay against the phase of the frequency of the reproduction clock signal, the frequency dividing controller 9 designates the frequency dividing ratio to n−p so as to advance the phase of the frequency of the divided frequency output signal of the frequency divider 8. When the phase of the frequency of the divided frequency output signal of the frequency divider 8 has an advancement against the phase of the frequency of the reproduction clock signal, the frequency dividing controller 9 designates the frequency dividing ratio to n+q so as to delay the phase of the frequency of the divided frequency output signal of the frequency divider 8. The values of p and q are designated corresponding to both clock jitter and the convergence time of the compensation of the above-described. Preferable values of the above-described variables are for example Fref=12.8 MHz, Fdiv=56 kHz, S=3, n=228, t=4, p=1, and q=1.

The frequency dividing controller 9 designates the frequencies of the reception clock signal and the transmission clock signal to desired values corresponding to the average value of the frequencies of the frequency divided output signal of the frequency divider 8. When the value of the phase difference information signal becomes positive or negative, the frequency dividing controller 9 controls the frequency divider 8 so as to compensate the phase and then switches the frequency dividing ratio corresponding to the average value. The frequency dividing controller 9 restricts the operation of the frequency divider 8 so as to suppress the jitter of the output clock signal. In other words, the frequency divider 8 has adjustment intervals (restriction intervals) so that the frequency divider operates at predetermined intervals.

Figure 2:
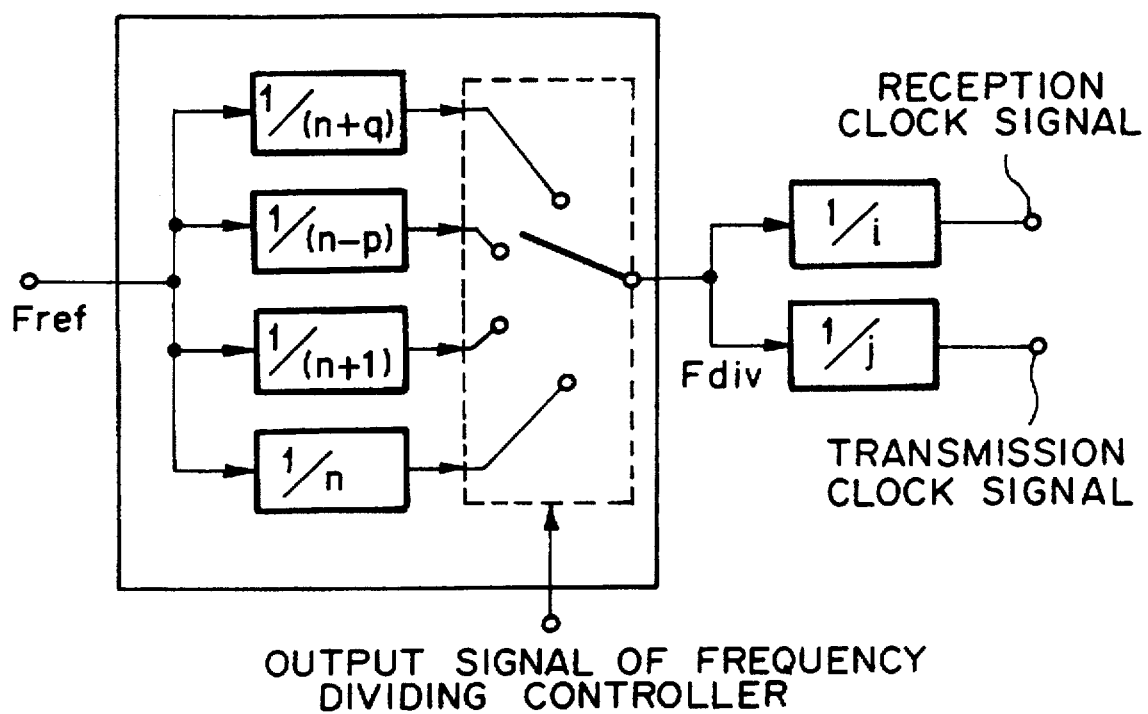
FIG. 2 is a block diagram showing a structure of a frequency divider.
Figure 4:
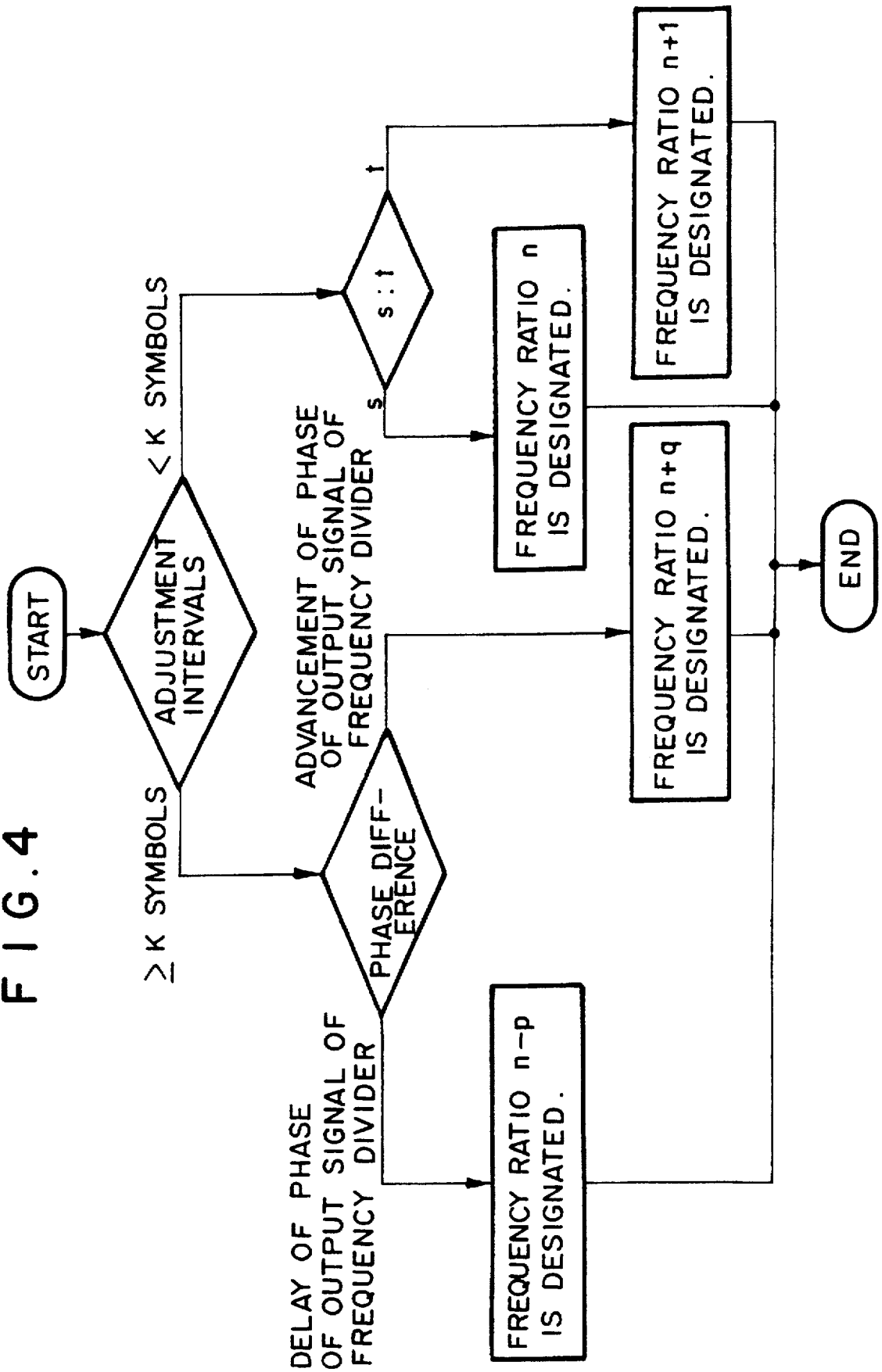
FIG. 4 is a flow chart of a frequency dividing controller.

FIG. 2 is a block diagram showing a structure of the frequency divider in the case that Freq/Fdiv is a non-integer. FIG. 4 is a flow chart of the operation performed by the frequency dividing controller 9. In this structure, the transmission clock signal synchronizes with the reproduction clock signal. When Freq/Fdiv is an integer, in FIG. 4, t=0 takes place.

Next, the frequency dividing operation will be described. The restriction intervals for the frequency dividing ratio adjustment performed corresponding to the phase difference information signal is denoted by K symbols. After the frequency dividing ratio is adjusted corresponding to the preceding phase difference information signal, it is determined whether or not K symbols have elapsed. When K symbols or more have elapsed, the frequency dividing ratio is designated to n−p or n+q corresponding to the phase difference information signal. When K symbols have not elapsed, the frequency dividing ratio is switched between n and n+1 at a switching ratio of s to t. Thus, Fdiv is generated. Thereafter, Fdiv is divided with. frequency dividing ratios i to j. Consequently, the reception clock signal and the transmission clock signal that are less affected by jitter are generated. In this case, preferable frequency dividing ratios are for example i=8 and j=8.

Figure 5:
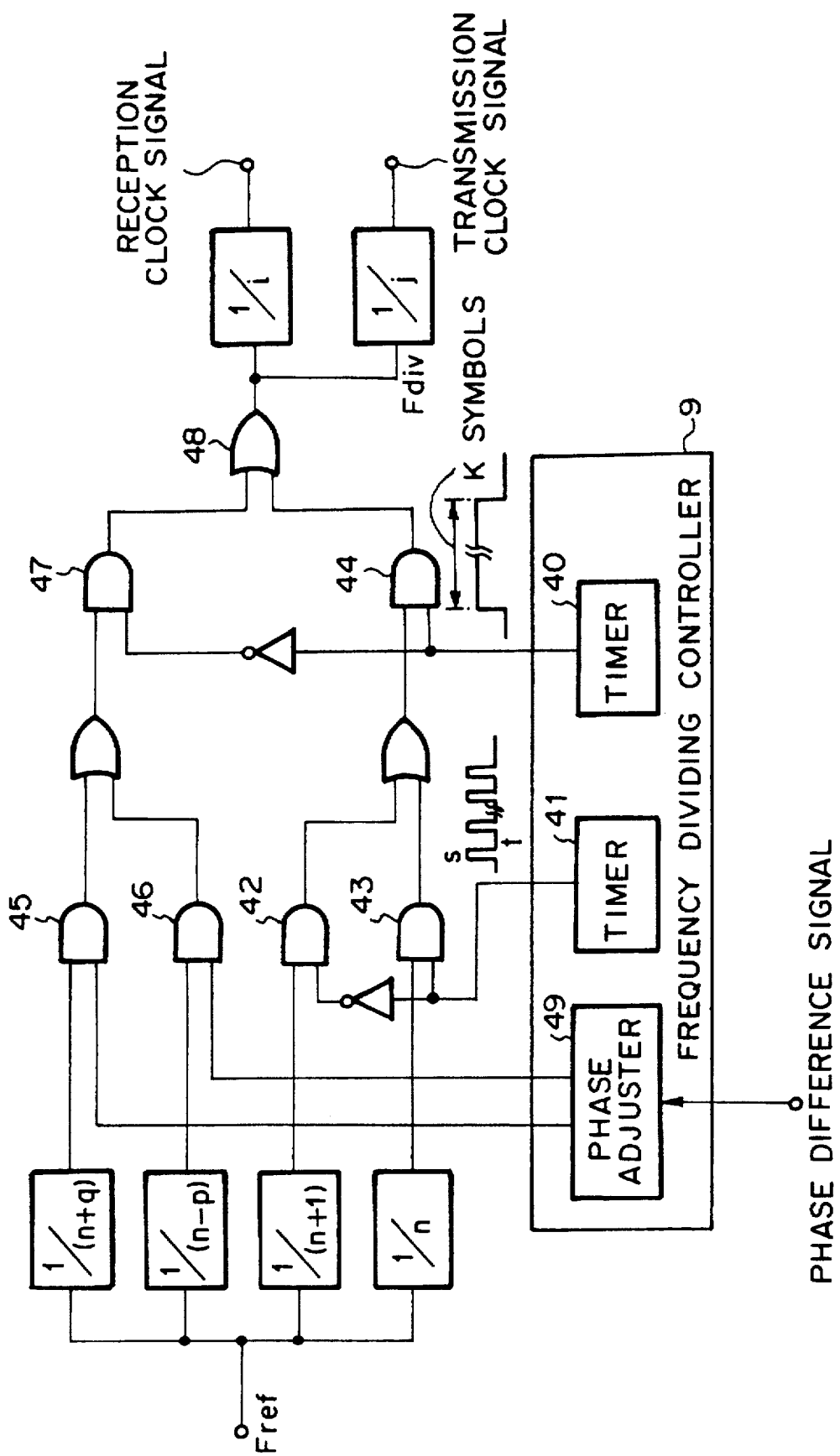
FIG. 5 is a block diagram showing real examples of a frequency divider and a frequency controller.

FIG. 5 is a block diagram showing a practical structure of a switching circuit of the frequency divider 8 and the frequency dividing controller 9 that perform the operation shown in FIG. 4. A timer 40 is used to generate the restriction intervals for the operation of the frequency divider 8. Namely, the timer 40 generates a frequency control signal of the frequency divider 8 that is switched between logic levels "1" and "0" at intervals of K symbols of data. A timer 41 generates a control signal switched between logic levels "1" and "0" for switching between the frequency dividing ratios 1/n and 1/(n+1) at a switching ratio of s to t.

When the logic level of the output signal of the timer 40 is "1", the signal level of an output signal of an AND gate 44 becomes "1". Thus, the signal of the average value is output from an OR gate 48.

When the logic level of the output signal of the timer 40 is "0", the signal level of the output signal of an AND gate 47 becomes "1". Thus, the compensation of the phase is performed corresponding to the phase difference signal. Consequently, a signal with a large frequency dividing ratio is output from the OR gate 48. In this case, when the phase of the frequency of the reception clock signal has a delay against the phase of the frequency of the reproduction clock signal, the signal level of an AND gate 46 becomes "1" and thereby the phase of the frequency of the output signal is adjusted by the phase adjuster 49 corresponding to the phase difference signal from the phase comparator 14. When the phase of the reception clock signal has an advancement against the phase of the reproduction clock signal, the signal level of an AND gate 45 becomes "1" and thereby the phase of the frequency of the output signal is adjusted by the phase adjuster 49 corresponding to the phase difference signal from the phase comparator 14.

The timer 40 may have a structure of which the signal with the logic level "1" is continuously output so as to continue the frequency dividing operation of the average value corresponding to the phase difference information signal when the phase of the frequency divided output signal is proper in a predetermined range. In this case, the timer 40 does not cause the phase to be compensated at the restriction intervals.

According to the present invention, the frequency divider 8 receives from the TCXO 7 a signal of which the frequency of a carrier wave received from a base station is automatically controlled. Thus, when the stability of both the carrier frequency of the transmission wave of the base station and the clock frequency of the base station is high, a frequency of the switching operation for the frequency dividing ratios corresponding to the phase difference information signal can be suppressed and thereby the jitter of the transmission clock can be reduced.

Figure 3:
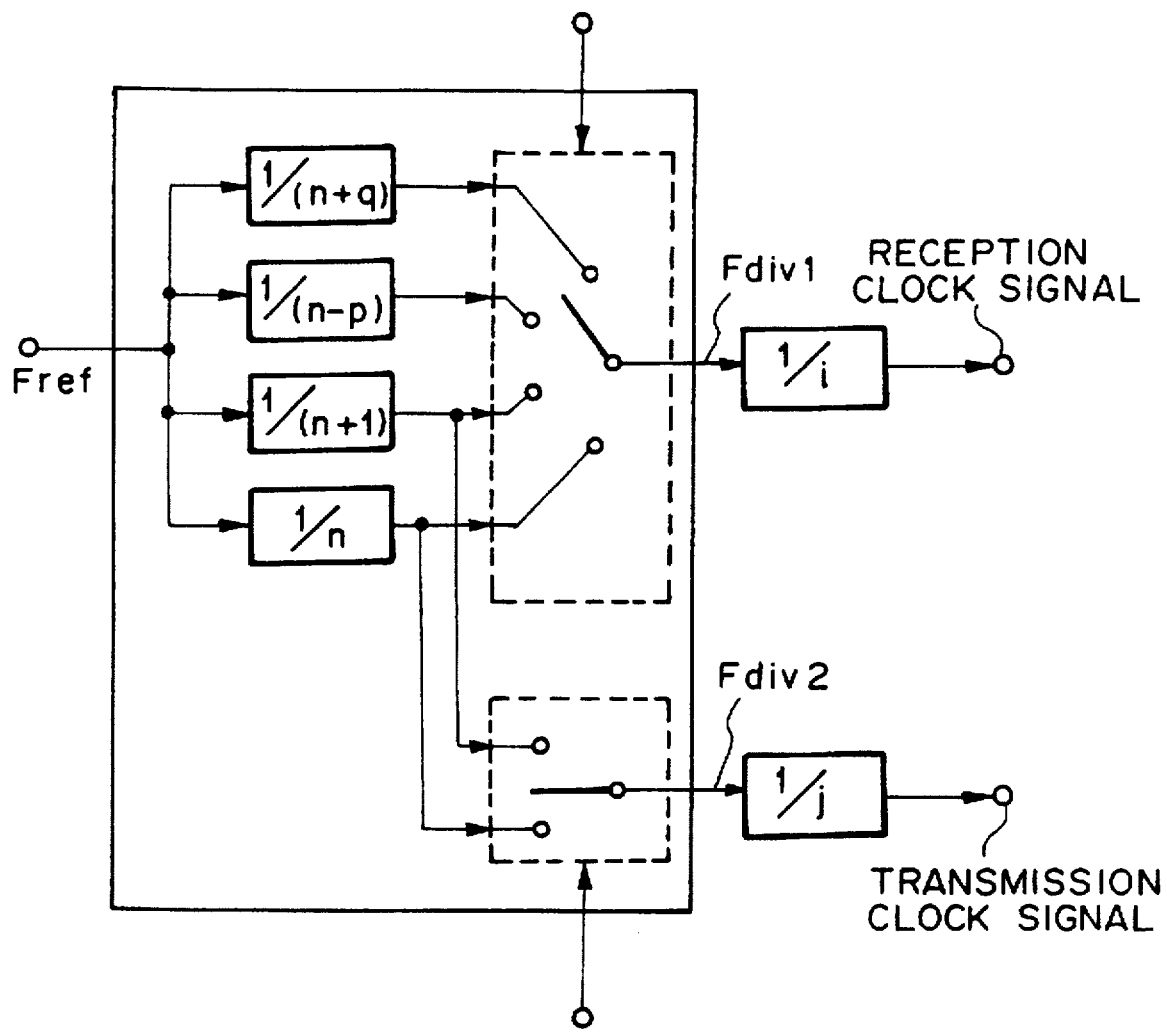
FIG. 3 is a block diagram showing another structure of the frequency divider.
Figure 6:
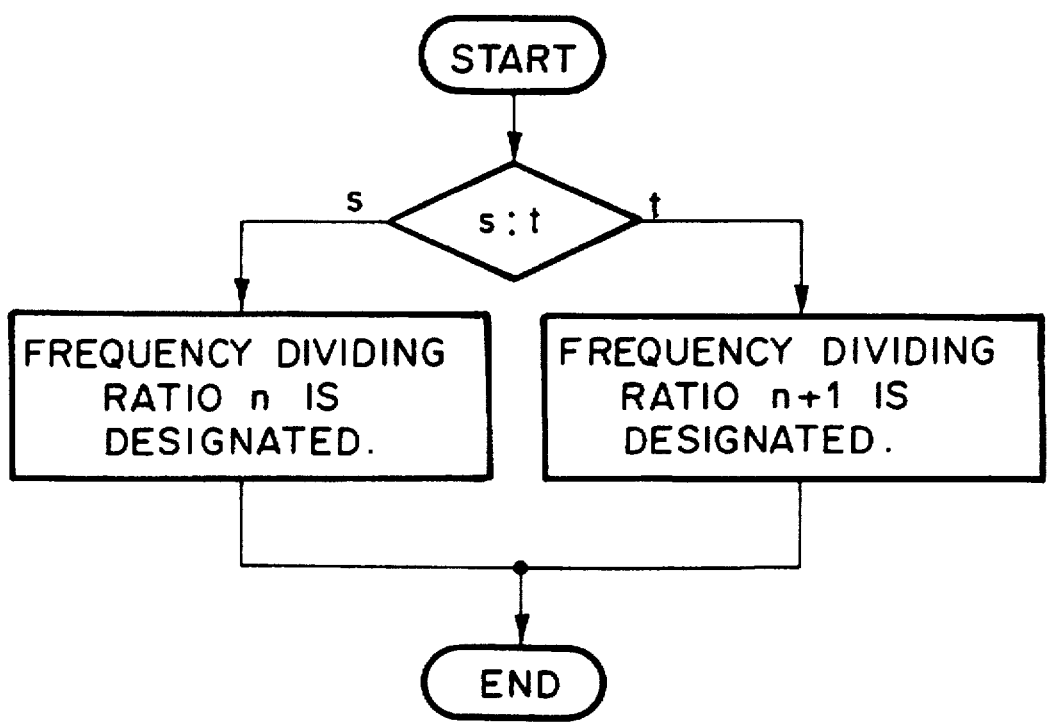
FIG. 6 is a flow chart of a frequency controller.
Figure 7:
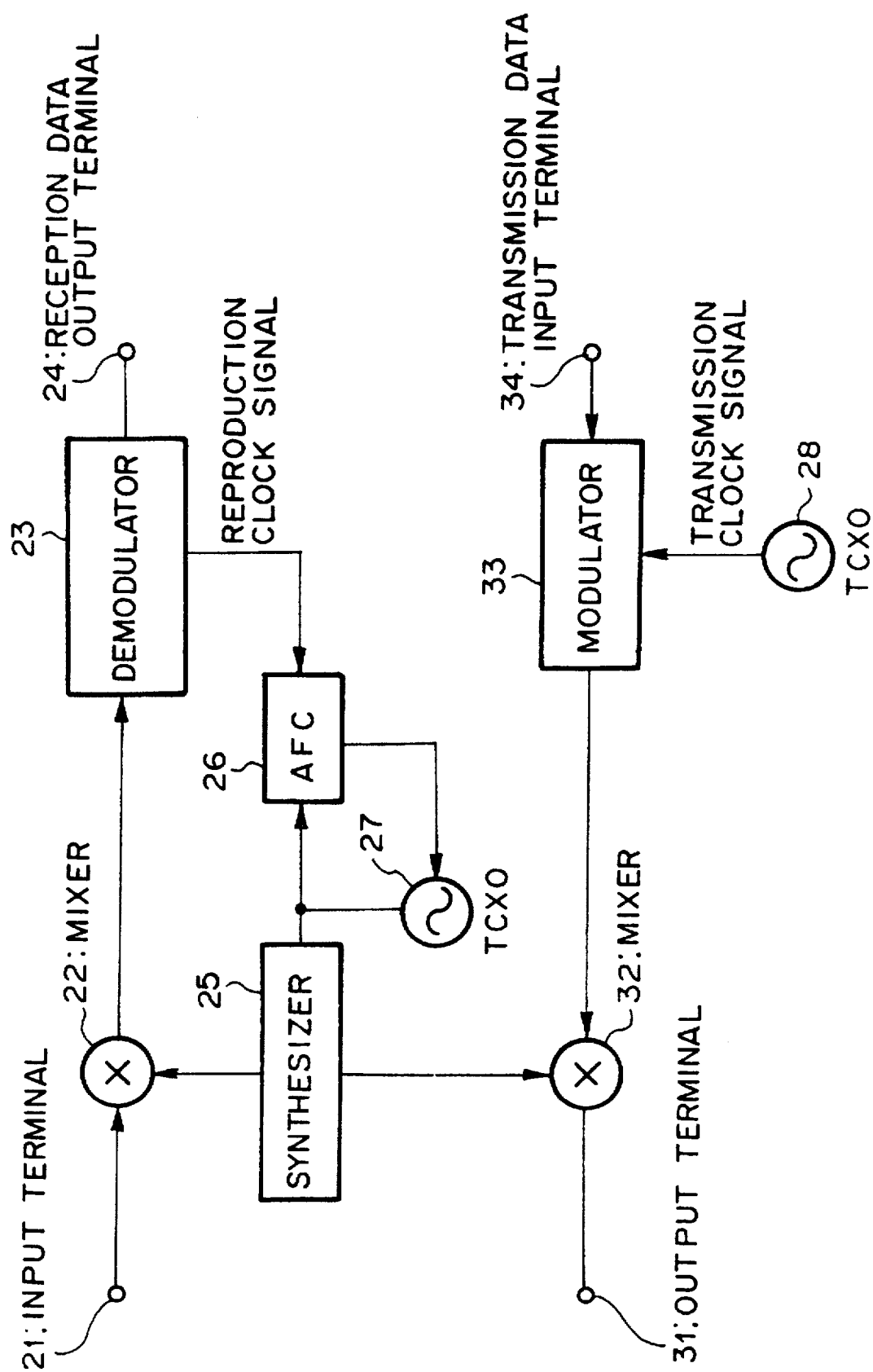
FIG. 7 is a block diagram showing a structure of a conventional radio communication station.

FIG. 3 is a block diagram showing another structure of the frequency divider 8 in the case that Fref/Fdiv of the frequency divider is a non-integer. In this structure, the transmission clock signal does not synchronize with the reproduction clock signal. The same stability as the carrier wave of a base station is accomplished. In FIG. 6, when Fref/Fdiv is an integer (=n), t=0 takes place.

Next, the operation shown in FIG. 3 will be described. As with the structure shown in FIG. 2, the reception clock signal is generated according to the output signal of the frequency dividing controller 9 shown in FIGS. 4 and 5. However, the transmission clock signal is generated according to an output signal of a frequency dividing controller shown in FIG. 6. In FIG. 6, the frequency dividing ratio is switched between n and n+1 at a switching ratio of s to t. In this manner, Fdiv1 and Fdiv2 are generated and divided by frequency dividing ratios i and j, respectively. Thus, the reception clock signal and the transmission clock signal are generated.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A radio communication terminal station, comprising:
   demodulating means for receiving a digital modulation signal and generating a reproduction carrier wave and a reproduction clock signal;
   an oscillator having a frequency control function;
   automatic frequency controlling means for controlling the frequency of an oscillation signal of said oscillator with reference to the reproduction carrier wave;
   a frequency divider for dividing the frequency of an output signal of said oscillator and outputting a reception clock signal and a transmission clock signal;
   a phase comparator for comparing the phase of the reception clock signal that is the output signal of said frequency divider with the phase of the reproduction clock signal and outputting a phase difference signal; and
   a frequency dividing controller for controlling the frequency dividing ratio of said frequency divider corresponding to the phase difference signal.

2. The radio communication terminal station as set forth in claim 1, further comprising:
   a modulator for receiving transmission data and modulating the transmission data with the transmission clock signal;

a synthesizer for receiving an output signal of said oscillator, and for issuing an output signal; and mixer means for converting the frequency of the output signal of said modulator with the output signal of said synthesizer and outputting a resultant signal.

3. The radio communication terminal station as set forth in claim 1, wherein said frequency divider comprises:

a first frequency divider portion for dividing the frequency of the output signal of said oscillator;

a second frequency divider portion for compensating the phase of the reception clock signal; and a third frequency divider portion for dividing the frequencies of output signals of the first frequency divider portion and the second frequency divider portion and outputting at least the reception clock signal, and wherein said frequency dividing controller is adapted for controlling the first frequency divider portion and the second frequency divider portion corresponding to the phase difference signal.

4. The radio communication terminal station as set forth in claim 3, wherein said frequency divider further comprises:

a fourth frequency divider for dividing the frequency of the output signal of the first frequency divider portion and outputting the transmission clock signal.

5. The radio communication terminal station as set forth in claim 4, further comprising:

a modulator for receiving transmission data and modulating the transmission data with the transmission clock signal;

a synthesizer for receiving an output signal of said oscillator and for issuing an output signal; and mixer means for converting the frequency of the output signal of said modulator with the output signal of said synthesizer and outputting a resultant signal.

6. The radio communication terminal station as set forth in claim 3, wherein said frequency divider further comprises:

a fourth frequency divider for dividing the frequency of the output signal of said oscillator and outputting the transmission clock signal.

7. The radio communication terminal station as set forth in claim 3, wherein the first frequency divider portion comprises a plurality of frequency dividers with different frequency dividing ratios, wherein said frequency dividing controller is adapted for switching among the plurality of frequency divider portions, wherein the second frequency divider portion comprises a plurality of frequency divider members with different frequency dividing ratios, and wherein said frequency dividing controller is adapted for selecting one of the plurality of frequency divider members corresponding to the phase difference signal and adjusting the phase.

8. The radio communication terminal station as set forth in claim 7, further comprising:

a modulator for receiving transmission data and modulating the transmission data with the transmission clock signal;

a synthesizer for receiving an output signal of said oscillator, and for issuing an output signal; and mixer means for converting the frequency of the output signal of said modulator with the output signal of said synthesizer and outputting a resultant signal.

9. The radio communication terminal station as set forth in claim 7, wherein said frequency divider further comprises:

a fourth frequency divider for dividing the frequency of the output signal of the first frequency divider portion or the frequency of the output signal of said oscillator and outputting the transmission clock signal.

10. The radio communication terminal station as set forth in claim 9, further comprising:

a modulator for receiving transmission data and modulating the transmission data with the transmission clock signal;

a synthesizer for receiving an output signal from said oscillator, and for issuing an output signal; and a mixer for converting the frequency of the output signal of said modulator with the output signal of said synthesizer and outputting a resultant signal.

11. A radio communication terminal station, comprising:

a first mixer for converting a reception signal modulated with a digital signal into an intermediate frequency signal or a base band signal;

demodulating means for receiving an output signal of said first mixer and generating a reproduction carrier wave and a reproduction clock signal;

an oscillator having a frequency control function;

automatic frequency controlling means for controlling the frequency of an oscillation signal of said oscillator corresponding to the reproduction carrier wave;

a synthesizer for receiving an output signal of said oscillator and outputting a reference signal;

a frequency divider for dividing the frequency of the output signal of said oscillator and outputting a reception clock signal and a transmission clock signal;

a phase comparator for comparing the phase of the reception clock signal that is the output signal of said frequency divider with the phase of the reproduction clock signal and outputting a phase difference signal; and a frequency dividing controller for controlling the frequency dividing ratio of said frequency divider corresponding to the phase difference signal, wherein said first mixer is adapted for converting the reception signal into the intermediate frequency signal or the base band signal corresponding to the output signal of said synthesizer.

12. The radio communication terminal station as set forth in claim 11, further comprising:

a modulator for receiving transmission data and modulating the transmission data with the transmission clock signal; and a second mixer for converting the frequency of the output signal of said modulator with the output signal of said synthesizer and outputting a resultant signal.

13. The radio communication terminal station as set forth in claim 11, wherein said frequency divider comprises:

a first frequency divider portion for dividing the frequency of the output signal of said oscillator;

a second frequency divider portion for compensating the phase of the reception clock signal; and a third frequency divider portion for dividing the frequencies of output signals of the first frequency divider portion and the second frequency divider portion and outputting at least the reception clock signal, and wherein said frequency dividing controller is adapted for controlling the first frequency divider portion and the second frequency divider portion corresponding to the phase difference signal.

14. The radio communication terminal station as set forth in claim 13, further comprising:

a modulator for receiving transmission data and modulating the transmission data with the transmission clock signal; and a second mixer for converting the frequency of the output signal of said modulator with the output signal of said synthesizer and outputting a resultant signal.

15. The radio communication terminal station as set forth in claim 13, wherein the first frequency divider portion comprises a plurality of frequency dividers with different frequency dividing ratios, wherein said frequency dividing controller is adapted for switching among the plurality of frequency divider portions, wherein the second frequency divider portion comprises a plurality of frequency divider members with different frequency dividing ratios, and wherein said frequency dividing controller is adapted for selecting one of the plurality of frequency divider members corresponding to the phase difference signal and adjusting the phase.

16. The radio communication terminal station as set forth in claim 15, further comprising:

a modulator for receiving transmission data and modulating the transmission data with the transmission clock signal; and a second mixer for converting the frequency of the output signal of said modulator with the output signal of said synthesizer and outputting a resultant signal.

17. The radio communication terminal station as set forth in claim 13, wherein said frequency divider further comprises:

a fourth frequency divider for dividing the frequency of the output signal of the first frequency divider portion and outputting the transmission clock signal.

18. The radio communication terminal station as set forth in claim 17, further comprising:

a modulator for receiving transmission data and modulating the transmission data with the transmission clock signal; and a second mixer for converting the frequency of the output signal of said modulator with the output signal of said synthesizer and outputting a resultant signal.

19. A radio communication terminal station, comprising:

a demodulator for receiving a digital modulation signal and generating a reproduction carrier wave and a reproduction clock signal;

an oscillator having a frequency control function;

an automatic frequency controller for controlling the frequency of an oscillation signal of said oscillator with reference to the reproduction carrier wave;

a frequency divider for dividing the frequency of an output signal of said oscillator and outputting a reception clock signal and a transmission clock signal; and a phase comparator for comparing the phase of the reception clock signal that is the output signal of said frequency divider with the phase of the reproduction clock signal and outputting a phase difference signal to control the frequency divider.

20. The radio communication terminal station as set forth in claim 19, further comprising:

a frequency dividing controller for controlling the frequency dividing ratio of said frequency divider corresponding to the phase difference signal;

a modulator for receiving transmission data and modulating the transmission data with the transmission clock signal;

a synthesizer for receiving an output signal from said oscillator, and for issuing an output signal; and a mixer for converting the frequency of the output signal of said modulator with the output signal of said synthesizer and outputting a resultant signal.

* * * * *

UNITED STATES PATENT AND TRADEMARK OFFICE
CERTIFICATE OF CORRECTION

PATENT NO. : 5,793,819
DATED : August 11, 1998
INVENTOR(S) : Hisashi Kawabata

It is certified that error appears in the above-identified patent and that said Letters Patent is hereby corrected as shown below:

column 9, line 2 delete "and", first occurrence;
line 2, after "output signal" insert --, and for outputting a local oscillation signal--.

Signed and Sealed this

Nineteenth Day of January, 1999

Attest:

Attesting Officer

*Acting Commissioner of Patents and Trademarks*